United States Patent
Braff et al.

(10) Patent No.: US 7,408,959 B2
(45) Date of Patent: Aug. 5, 2008

(54) METHOD AND APPARATUS FOR ENSURING CELL ORDERING IN LARGE CAPACITY SWITCHING SYSTEMS AND FOR SYNCHRONIZING THE ARRIVAL TIME OF CELLS TO A SWITCH FABRIC

(75) Inventors: Martin Braff, Aberdeen, NJ (US); Gopalakrishnan Ramamurthy, West Windsor, NJ (US); William J. Dally, Stanford, CA (US)

(73) Assignee: LSI Corporation, Milpitas, CA (US)

( * ) Notice: Subject to any disclaimer, the term of this patent is extended or adjusted under 35 U.S.C. 154(b) by 1133 days.

(21) Appl. No.: 10/325,701

(22) Filed: Dec. 18, 2002

(65) Prior Publication Data

US 2003/0227945 A1 Dec. 11, 2003

Related U.S. Application Data

(60) Provisional application No. 60/387,394, filed on Jun. 10, 2002.

(51) Int. Cl.
*H04J 3/06* (2006.01)
(52) U.S. Cl. ............... 370/508; 370/395.4; 370/395.62; 370/503
(58) Field of Classification Search ................ 370/230, 370/230.1, 235, 395.4, 395.62, 468, 503, 370/508
See application file for complete search history.

(56) References Cited

U.S. PATENT DOCUMENTS 5,436,886 A * 7/1995 McGill ................ 370/219
5,485,453 A * 1/1996 Wahlman et al. ............ 370/389
6,246,687 B1 6/2001 Siu
6,359,861 B1 3/2002 Sui et al.
6,665,315 B1 * 12/2003 Karasawa ................... 370/508
6,850,704 B1 * 2/2005 Dave ............................ 398/2
7,187,654 B1 * 3/2007 Beshai et al. ................ 370/251
7,212,551 B1 * 5/2007 Beshai et al. ................ 370/509
2002/0109879 A1 * 8/2002 Wing So ..................... 359/118
2003/0193937 A1 * 10/2003 Beshai et al. ................ 370/372

FOREIGN PATENT DOCUMENTS

WO  WO 9704564 A1 * 2/1997
WO  WO 9935792 A1 * 7/1999

OTHER PUBLICATIONS

Tobajas, F. et al., "Round-Trip Delay Effect on Iterative Request-Grant-Accept Scheduling Algorithms for Virtual Output Queue Switches," IEEE Global Telecommunications Conference, 2002. Nov. 2002. vol. 2, pp. 1889-1893.*

* cited by examiner

*Primary Examiner*—Chi H. Pham
*Assistant Examiner*—Donald L Mills
(74) *Attorney, Agent, or Firm*—Christopher P. Maiorana, P.C.

(57) ABSTRACT

Where links between a port module and plural switch fabric slices are of various lengths, a cell is transmitted from the port module to a switch fabric slice in response to a grant. The transmission is delayed by an amount based on a link round trip delay (RTD) value for the corresponding link between the port module and the switch fabric slice, and a predetermined global delay value. As a result of this delay, the cell arrives at the switch fabric slice at a fixed number of cell times (equal to the global delay value) after issuance of the grant, independent of any link lengths.

37 Claims, 6 Drawing Sheets

METHOD AND APPARATUS FOR ENSURING CELL ORDERING IN LARGE CAPACITY SWITCHING SYSTEMS AND FOR SYNCHRONIZING THE ARRIVAL TIME OF CELLS TO A SWITCH FABRIC

RELATED APPLICATION(S)

This application claims the benefit of U.S. Provisional Application No. 60/387,394, filed Jun. 10, 2002 for "Large Capacity Switching System," by Gopal Meempat, G. Ramamurthy, William J. Dally and Martin Braff. The entire teachings of the above application are incorporated herein by reference.

BACKGROUND OF THE INVENTION

Large capacity packet switches are often implemented with buffered input and buffered output port modules, that are interconnected with multiple cross-bar switching fabric slices. FIG. 1 shows such a packet switching system 10. Typically, packets are segmented into fixed-size cells before being presented to the switch. Likewise, the switch delivers packets as segmented fixed-size cells. Cells arriving on an input link i 12 are buffered in the corresponding input port module i 14. Typically cells are stored in the input module in virtual output queues (not shown), where one queue is maintained at the input for each output port module.

In order to achieve a high switching capacity, multiple instances (slices) of cross bar switching fabrics 18 are used. As shown in FIG. 1, each input port module 14 is connected to all of the cross-bar switching fabric slices 18 over links 16. Cells are transmitted from an input port module 14 to a destination output port module 22 over the multiple switch fabric slices 18 (and links 16, 20) so as to "load share" the traffic appearing on the switch fabric slices 18. Although not shown, a single port module typically contains both an input port module 14 and an output port module 22.

In a typical packet switching system 10, a port module sends request messages, which may be imbedded in the cell headers, to the switching fabrics 18, to indicate that the port module wishes to transmit cells to specific destinations through the switch fabrics 18.

Each switch fabric slice 18 contains a scheduling function (not shown) that resolves output contention among multiple input requests. The switch fabric then sends "grant messages", also imbedded in the cell headers, to the port modules. These "grant messages" indicate that a port module is to transmit a cell to a specific destination. The cell that is transmitted in response to such a "grant message" must arrive at the switch fabric slice at the precise time it is expected by the switch fabric scheduler.

Each output port module 22 receives multiple cells from the various switch fabrics, and must transmit these cells serially, in the same order in which they arrived at the respective input port module 14.

In a large capacity packet switching system, the communication links 16, 20 connecting the port modules 14, 22 and switch fabrics 18 are generally high-speed serial links running at several gigabits/sec. The design of such a system may be simplified if the various input 14 and output 22 modules and their associated links can operate with independent clocks.

Furthermore, such a system often occupies many equipment bays and it is useful to allow for flexibility in the physical placement of these bays. This in turn implies that the various transmission links 16, 20 from port modules to switch fabrics will vary significantly in length.

Several alternatives exist for dealing with the issues of cell ordering, and switch fabric synchronization.

For example, packets going to a specific destination port module could be restricted to a single switch fabric slice. This would ensure that cells are delivered in order. This has the disadvantage of limiting the bandwidth available between a single source and destination port module.

Alternatively, the system could be required to operate from a single clock, with carefully matched delays among the serial links.

Further still, cell ordering overhead information could be added to each cell, allowing the output port module to establish correct cell order. Such reordering can be very costly, with respect to high speed operation.

SUMMARY OF THE INVENTION

The present invention provides a method and apparatus able to satisfy the following two system requirements:
  Ensuring that cells arrive at the switch fabric synchronized with the switch fabric scheduler.
  The output port module is able to transmit cells in the same order as they arrived at the input port module.

These requirements are satisfied without requiring a system wide common high speed clock. Cells destined to a single output can be load shared over an arbitrary set of switching fabric slices. Also, no added ordering information need be inserted in the cells.

These two objectives of the present invention are achieved by an encapsulation of a group of cells in a novel framing structure. This framing structure allows the synchronization of the rate of cell transfers between the port modules and the switch fabric. It also allows for the measurement and compensation for the delay between the port module and switch fabric.

Accordingly, to maintain cell arrival time synchronization between a port module and plural switch fabric slices, where links between the port module and the switch fabric slices are of varying lengths, a grant is received at the port module from a switch fabric slice. A cell is then transmitted from the port module to the switch fabric slice in response to the grant. However, the cell transmission is delayed by a delay amount based on a link round trip delay (RTD) value for the corresponding link between the port module and the switch fabric slice, causing the cell to arrive at the switch fabric slice a predetermined number of cell times (defined by a predetermined global delay value) after issuance of the grant, independent of any link lengths (and hence independent of any RTDs).

Each switch fabric slice determines a round trip delay (RTD) value for each link based on a phase or cell time difference between a transmitted frame and a received frame. The determined link RTD values are transmitted from the respective switch fabric slices to the port module.

Transmissions of cells from the switch fabric slices may be synchronized, for example, by distributing a low-speed frame clock from a common source to each switch fabric slice, encapsulating groups of cells into variable-size frames and, at the switch fabric slices, aligning the boundaries of variable-size transmit frames with the frame clock by dynamically modifying sizes of the frames. The aligned frames may then be transmitted.

In one embodiment, a variable-size frame includes a variable-size frame header and a fixed-size data payload. The variable-size frame header includes a variable-size component, followed by a fixed-size component. The fixed-size component may be used to identify, at receivers within the port module and the switch fabric, the beginning of the data payload.

At the port module, a boundary of a transmit frame may be aligned with a frame received from a corresponding switch fabric slice.

The data payload may be scrambled, for example, by a frame synchronous scrambler.

Each switch fabric slice may further have its own local clock. Each switch fabric slice receiver may contain an elastic buffer large enough to hold at least one full cell. Upon initialization of a link, the elastic buffer is cleared. Data is read out of the elastic buffer when a) the elastic buffer contains at least a predetermined amount of data, and b) the switch fabric's local clock indicates the beginning of a transmit cell boundary.

The round trip delay (RTD) value for each link may then be determined by each switch fabric slice by determining the phase (cell time) difference between a transmitted frame and a received frame, after reading the data out of the corresponding elastic buffer.

The predetermined number of data bytes that the elastic buffer can hold is sufficient to prevent underflow of the elastic buffer in the presence of worst case timing jitter.

The port module may be operated from a local clock independent of switch fabric clocks.

Port module to switch fabric links may span distances of up to several hundred meters.

Each port module may include a separate input queue for each destination, as well as an output queue. Arriving cells are stored into the input queues, in the order of arrival, and according to destination. Grants received from the switch fabric slices are serviced by removing cells from the corresponding input queues and transmitting the removed cells to the corresponding switch fabric slices. Grants received during a particular cell time are served prior to grants received during a later cell time. Within a single cell time, grants are served over links in a predetermined order. All cells arriving from the switch fabric slices during a particular cell time are stored in the output queue prior to cells arriving during a later cell time. Within a single cell time, cells are stored in the predetermined order according to the links on which the cells arrived.

In one embodiment, each switch fabric module is assigned a unique number. Each link is assigned the same number as the switch fabric to which it connects. The unique numbers may be assigned sequentially, or according to some other fixed scheme.

The port modules and switch fabric slices may operate from independent link clocks.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Framing

In order to synchronize the operation of multiple switch fabrics and port modules which operate from independent high-speed clocks, an embodiment of the present invention uses a variable-size framing structure.

Figure 2:
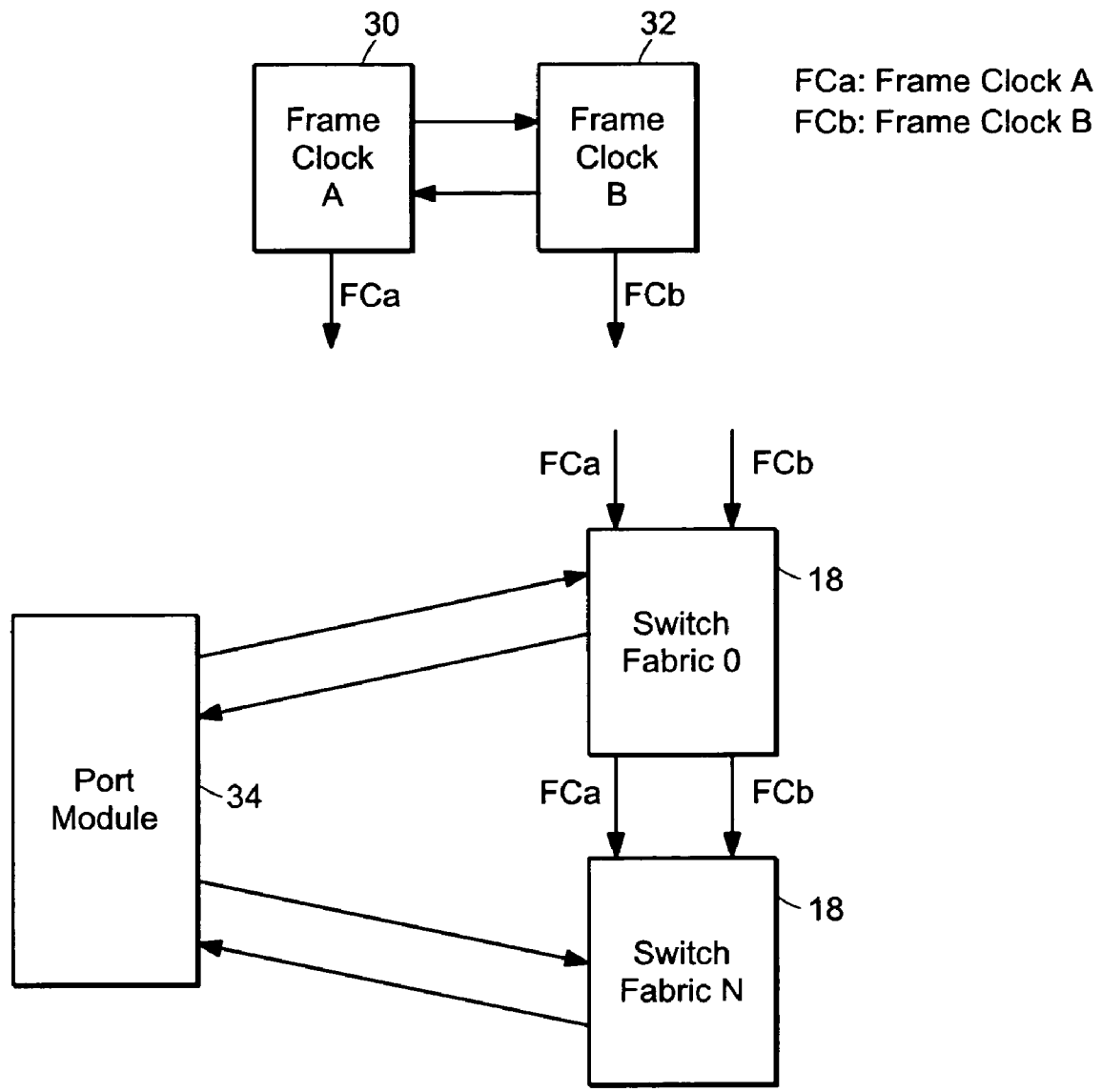
FIG. 2 is a schematic diagram illustrating a redundant frame clock, as used by an embodiment of the present invention.

FIG. 2 is a schematic diagram illustrating a redundant frame clock, as used by an embodiment of the present invention, A common low-speed frame rate clock 30 is distributed from a common source to all of the switch fabric modules 18. In one embodiment, a backup frame rate clock generator 32 provides extra reliability. It is significantly less costly to distribute a low-speed framing clock 30, 32 to the switching fabrics 18, than to distribute a high-speed low jitter clock for data transmission.

The switch fabrics 18 and port modules 34 transmit groups of cells encapsulated in frames. The frame boundaries are identified by a variable size framing pattern. In one embodiment, the framing pattern can be selected to be either three, four, or five bytes.

Figure 3:
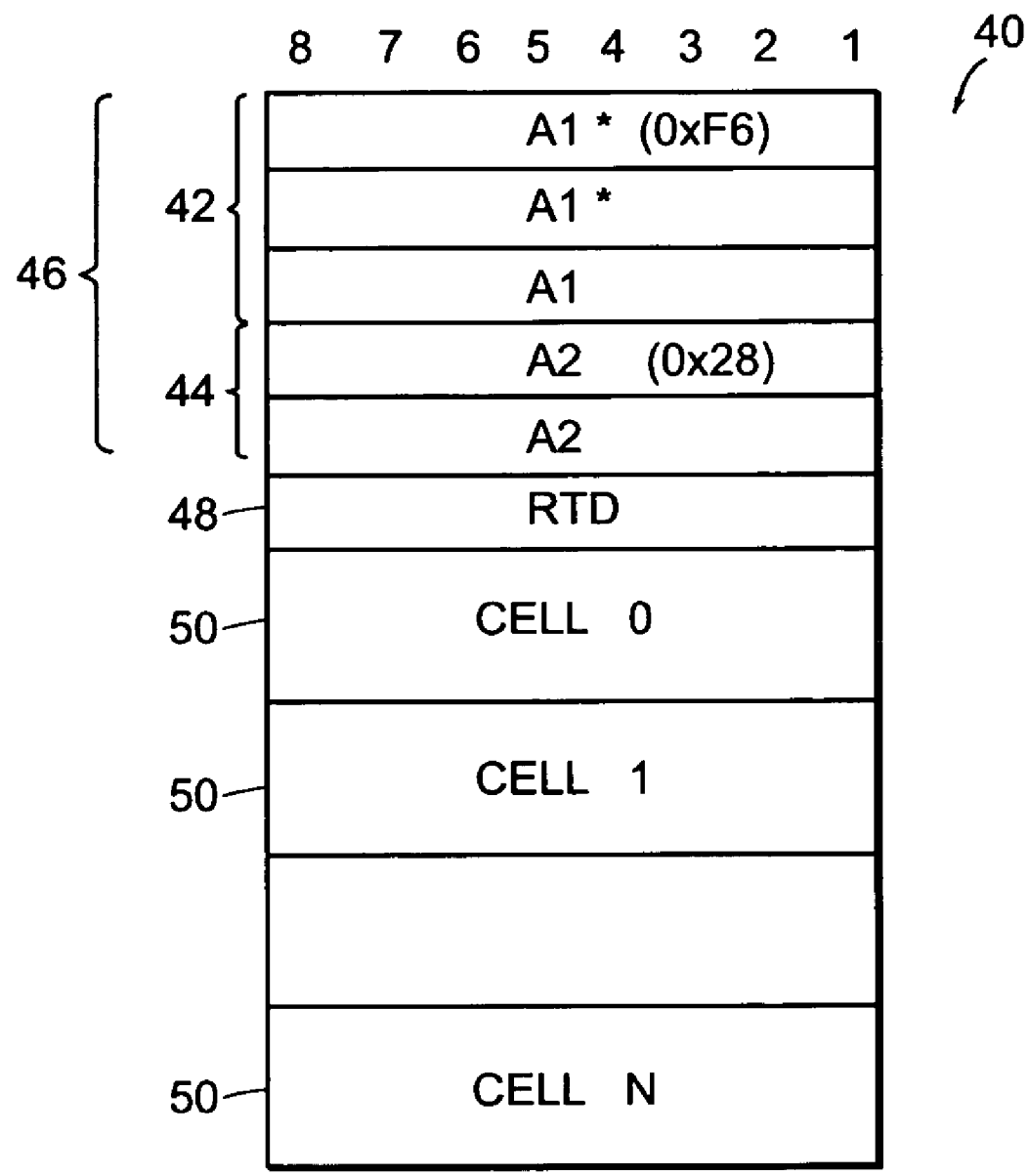
FIG. 3 is a schematic diagram illustrating the frame format 40 used by an embodiment of the present invention.

FIG. 3 is a schematic diagram illustrating the frame format 40 used by an embodiment of the present invention. The frame has both a variable-size frame header 46 and a fixed-size data payload, containing a round trip delay (RTD) value 48 (discussed below) and a fixed number (e.g., sixteen) of cells. The variable-size frame header 46 contains both a variable size component 42 and a fixed-size component 44. Here, allowed framing patterns are (A1, A2, A2) or (A1, A1, A2, A2) or (A1, A1, A1, A2, A2), where A1=0×F6, and A2=0×28. Other patterns and values may also be used.

The fixed-size component 44 always contains a fixed number of A2 characters. This allows a receiver to identify the end of the framing pattern. Each switch fabric transmitter varies the transmitted frame size so that every transmitted frame is aligned with the common frame clock.

Figure 4:
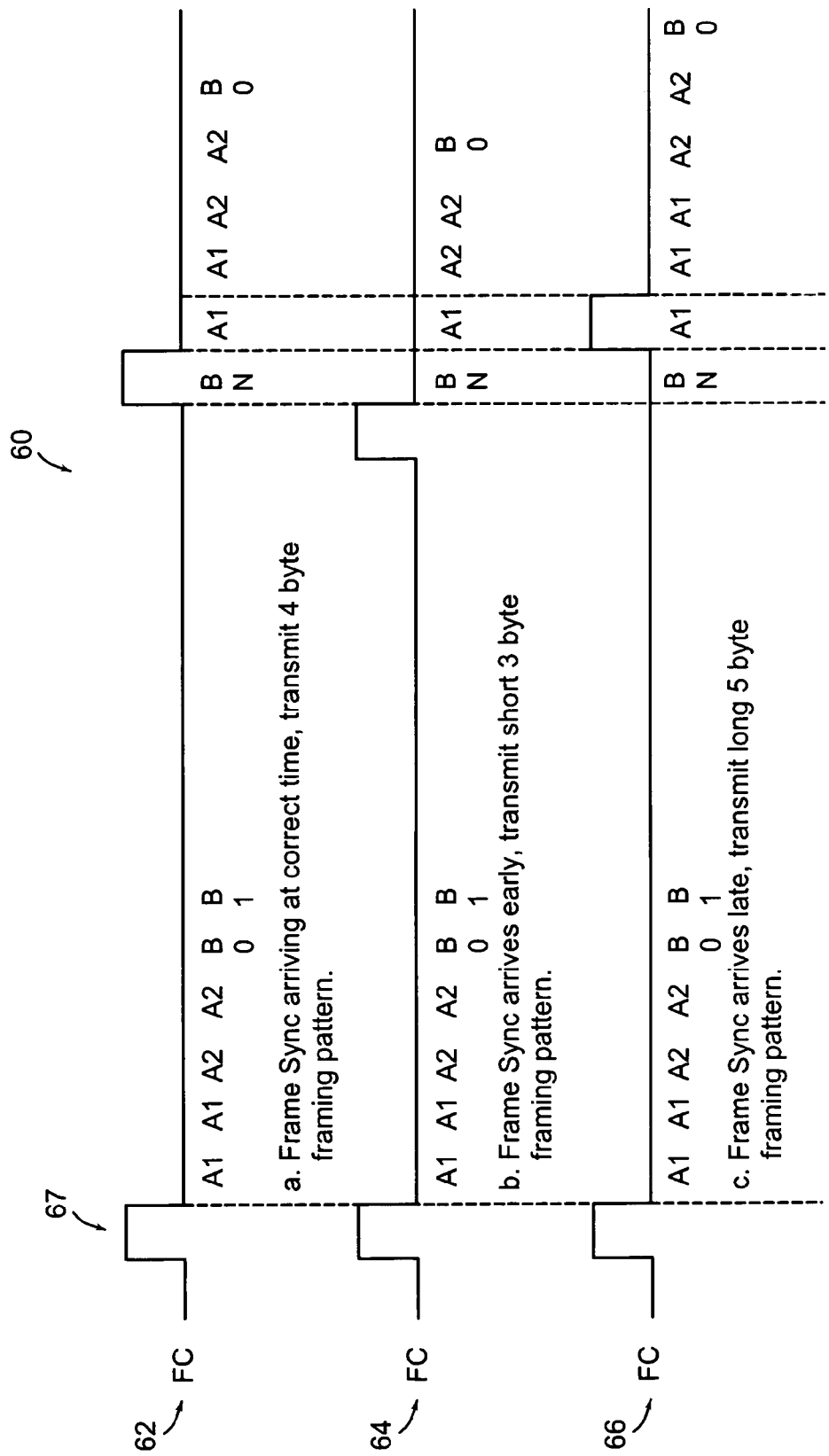
FIG. 4 is a timing chart illustrating an alignment procedure of an embodiment of the present invention.

FIG. 4 is a timing chart illustrating this alignment procedure. In all three cases, 62, 64, 66, a frame sync pulse is output from the frame clock (FC) at 67. This triggers a normal header (A1, A1, A2, A2) followed by N+1 bytes B0, . . . , BN (including RTD).

Later, in graph 62, the frame sync pulse arrives at the correct time and another normal header is transmitted.

In graph 64, on the other hand, the frame sync pulse arrives before the end of frame, and a shortened (3 byte) framing pattern is transmitted for the next frame.

Finally, graph 66 shows the case where the frame sync pulse arrives late, after the end of frame. Here, a long (5 byte) framing pattern is transmitted for the next frame.

Port Module Transmitter Function

Each port module receiver generates a frame pulse whenever an A1/A2 transition is detected in an incoming frame received from a switch fabric. The port module transmitter then aligns its transmitted frame boundaries to this frame pulse in the same manner as the switch fabric transmitter does with the frame clock.

Synchronization of Switch Fabrics and Port Modules

Figure 5:
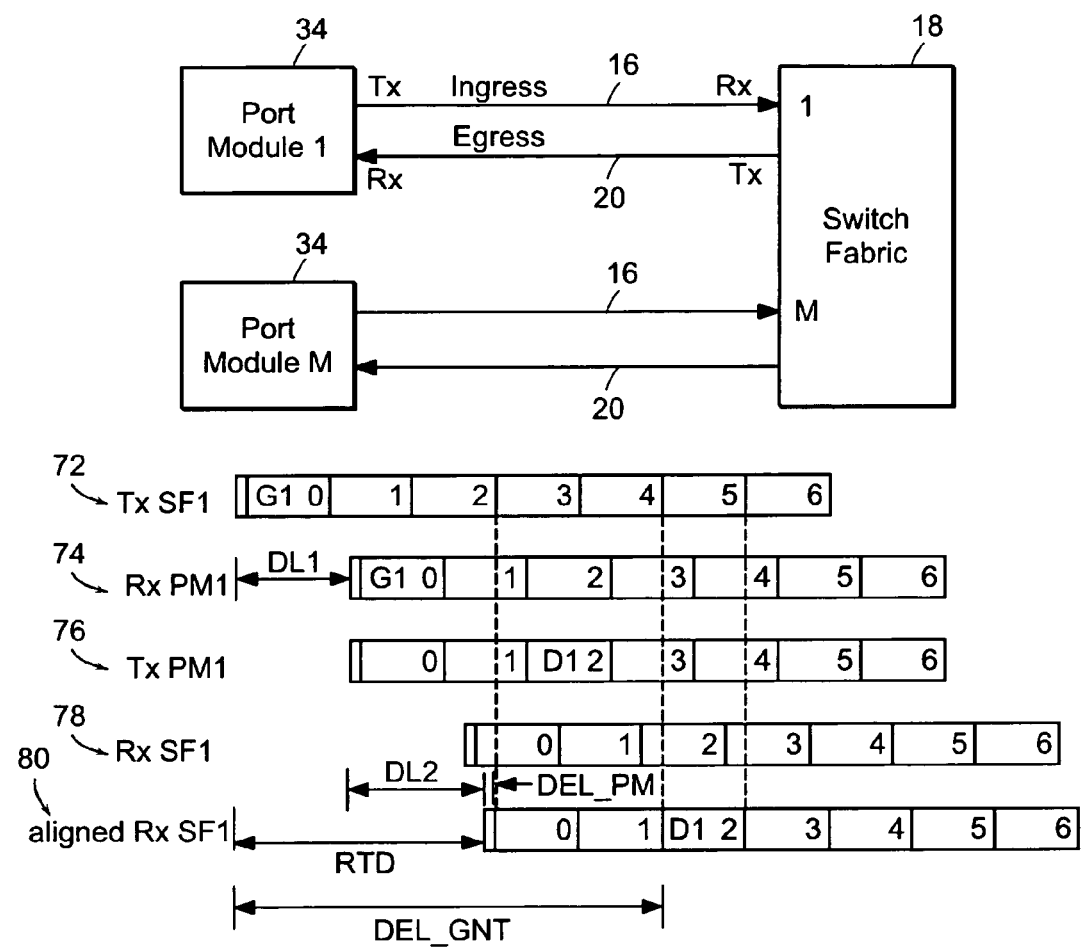
FIG. 5 is a schematic diagram illustrating the timing, in an embodiment of the present invention, between multiple port modules connected to a switch fabric slice.

FIG. 5 is a schematic diagram illustrating the timing between multiple port modules 34 connected to a switch fabric slice 18. As described above, all frames transmitted by the switch fabric 18 are aligned to a common low-speed frame clock, and each port module 34 aligns its transmitted frame boundaries with the frame received from the switch fabric 18. This is achieved by adjusting the size of the framing pattern to accommodate clock differences between the switch fabric and port module.

The frame received by the switch fabric is further internally aligned with the local clock's cell boundary, using an "elastic buffer" (not shown) at each switch fabric input. Cells are written into this buffer using the recovered clock from a received frame, and cells are read out of this buffer using the switch fabric's own local clock (which is different than the common frame clock). The reading of the elastic buffer begins at a local cell boundary. The size of the elastic buffer must be large enough to accommodate a full cell, plus the maximum peak to peak jitter expected by the switch fabric.

In one embodiment, for example, a 160-byte elastic buffer is used. This size accommodates a 128 byte cell, plus 32 bytes of peak to peak input jitter. The elastic buffer is initialized by prefilling it with the first 16 bytes of a received frame. Following this, reading of the buffer is enabled at the next internal cell boundary. Underflow/overflow of the elastic buffer only occurs due to an error condition.

The elastic buffer at the input to the switch fabric causes the round trip delay (RTD) from the switch fabric to the port module and back to the switch fabric to be a fixed integer number of cells. When the switch fabric is reading the first cell of a frame out of the elastic buffer, the cell number currently being transmitted corresponds to the RTD value. This value is latched by the switch fabric and transmitted in the next egress frame header. See FIG. 3.

Thus, graph 72 illustrates a frame (in this exemplary case, a 7-cell frame) being transmitted by a switch fabric to a port module. The first cell, cell 0, carries a grant G1.

Graph 74 illustrates the same frame as received by the port module. The frame has been delayed by an amount DL1, where DL1 is the one way delay from the switch fabric 18 to the port module 34, due primarily to the length of the link 20 between them.

As graph 76 illustrates, a frame transmitted by the port module is synchronized with the incoming frame (graph 74) and so is delayed by DL1 with respect to the frame transmitted by the switch fabric (graph 72). For the switch fabric to work correctly, the data D1 whose request has been granted must be received by the switch fabric exactly DEL_GNT cell times after the grant was issued, where DEL_GNT is a specified parameter chosen to be larger than any possible round trip delay. If cell(SF) represents the cell number currently being transmitted at a particular time by the switch fabric, and cell(PM) represents the cell number being transmitted by the port module at the same time, then these two are related by:

cell(PM)=cell(SF)−DL1.

For the cell containing data D1 to arrive at the switch fabric at DEL_GNT cell times after its corresponding grant issuance, it must be transmitted by the port module in cell cell(SF)=DEL_GNT−DL2, or cell(PM)=DEL_GNT−(DL1+DL2), where DL2 is the one way delay from the port module to the switch fabric, after adjustment by the elastic buffer.

Since DL1+DL2=RTD, the cell containing D1 must be transmitted by the port module in cell time cell(PM)=DEL_GNT−RTD in order to arrive at the switch fabric DEL_GNT cell times after the grant was issued.

Thus, for a granted cell D1 to arrive at the switch fabric DEL_GNT cell times after issuance of the grant, the port module must transmit the cell at cell time: DEL_GNT−RTD=DEL_PM. The port module may then compute DEL_PM for each link or switch fabric slice. DEL_PM specifies the delay the port module must insert between receiving a grant G1 and transmitting the granted cell D1, in order for the transmitted cell D1 to arrive at the switch fabric at the expected time.

In the example shown in FIG. 5, DEL_GNT=5 and RTD=3. DEL_PM therefore is equal to 2. A grant (G1) is sent by the switch fabric at cell time cell(SF)=0 (graph 72). The port module sends the corresponding cell D1 at cell time cell(PM)=2 (graph 76), and the cell arrives at the switch fabric at cell time cell(SF)=5 (graph 80). Graph 78 simply shows the timing of the received frame at the switch fabric prior to the elastic buffer.

Cell Sequencing With Multiple Switch Fabric Slices

Figure 1:
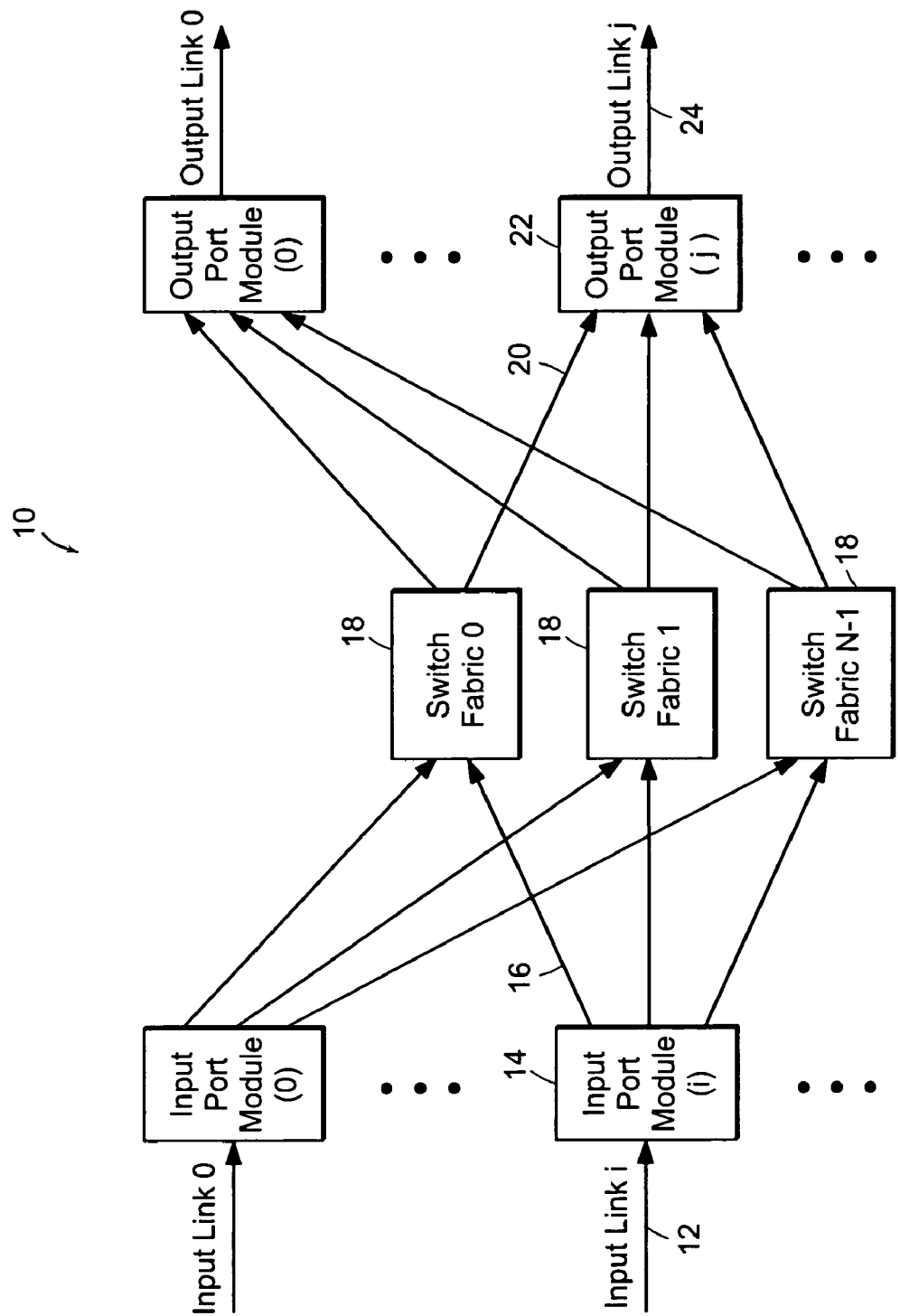
FIG. 1 is a schematic diagram illustrating a packet switching system.

As shown in FIG. 1, a port module may be connected to N switch fabrics. During a single cell time, each port module can transmit and receive as many as N cells. When receiving multiple cells from the same input port module, the correct order of these cells must be maintained.

Each switch fabric may be provided with a pair of redundant global frame clock signals. The nominal interval between frame clock pulses is (6+16*CELL_SIZE) byte clocks. One of the clocks is designated as active, while the other is designated as standby. During normal fault free operation, all active frame synchronization pulses originate from the same active frame clock module. Each switch fabric continually monitors the active frame clock signal and, in the event of a failure, switches to the standby signal.

As described above, each switch fabric link transmitter aligns its frame boundary with the selected frame clock signal. The frame alignment described above provides a means to maintain cell order among cells sent via multiple switch fabrics.

Each switch fabric module is assigned a unique number, sequentially from 0 to N−1. All port module links are assigned the same number as the switch fabric to which they connect. Cell times on each link are numbered sequentially, with the cell immediately after the framing bytes being cell time 0.

When multiple grants specifying the same destination queue arrive at a port module, cells are removed from the specified queue and assigned to the grants. All grants arriving during cell time i are served prior to grants arriving during cell time i+1. Furthermore, within a single cell time, grants are served in some fixed link order. For example, where the links are numbered sequentially, link j is served prior to link j+1.

Cells arriving at a port module from multiple switch fabric slices are written to the output queues in a specific order. All cells arriving during cell time i are stored prior to storing cells arriving during cell time i+1. Furthermore, within a single cell time, cells are stored in the same fixed order in link order in which grants were served. For example, where the links are numbered sequentially, link j is stored prior to link j+1.

Data Scrambling

In one embodiment of the present invention, all data other than the framing bytes is scrambled by a frame synchronous scrambler, e.g., a scrambler that is initialized at the start of each frame, using the SONET generator polynomial $1+X^6+X^7$.

Scrambling consists or XORing the data to be transmitted with a pseudo random sequence. The pseudo random sequence used is defined by the relationship:

$$r(n)=r(n-6)\ XOR\ r(n-7).$$

With r(0) through r(6) being initialized to 1 at the first transmitted bit following the framing sequence. Descrambling consists of simply repeating the scrambling function.

Frame Clock Modules

Figure 6:
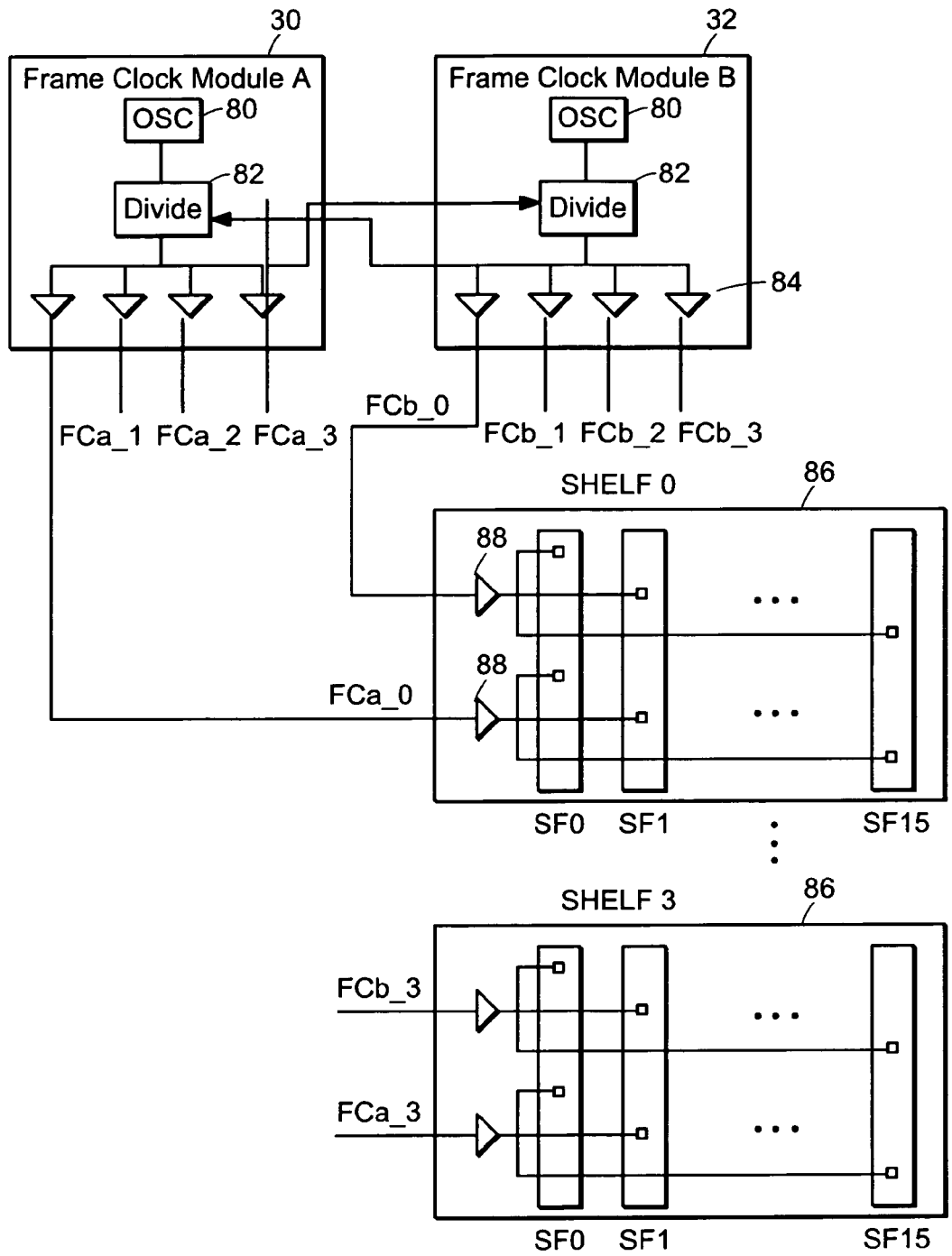
FIG. 6 is a schematic diagram illustrating the structure and interconnection of an embodiment of the present invention using two independent frame clock modules

FIG. 6 is a schematic diagram illustrating the structure and interconnection of a system using two independent frame clock modules 30, 32. As shown, each frame clock module 30, 32 comprises an oscillator 80, a divide function 82 and buffers 84. Each frame clock module may be in an active or standby state. The standby timing module monitors the frame clock signal from the active module, and adjusts the divide value to maintain alignment between the active and standby frame clock signals.

To do this, the clock divider in the standby timing module must implement a divide by M−1, M or M+1 function. The standby timing module monitors the signal from the active module for failures, and upon detecting an active frame clock failure, switches to operating with a fixed divide by M as in active mode.

In the exemplary system configuration illustrated in FIG. 6, sixty-four switch fabrics are used, each on a separate circuit board. Four shelves 86 are used to house the separate circuit boards. Each frame clock module 30, 32 outputs four frame clock signals, providing one signal for each shelf 86. Each shelf 86 has a buffer 88 to provide the fan-out for the sixteen switch fabrics on each shelf. A total of eight cables are thus needed to interconnect the frame clock modules 30, 32 to the shelves 86.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for maintaining cell arrival time synchronization between a port module and plural switch fabric slices, where links between the port module and the switch fabric slices are of varying lengths, comprising:
   receiving, at the port module, a grant from a switch fabric slice;
   transmitting a cell from the port module to the switch fabric slice in response to the grant;
   delaying said cell transmission by a delay amount based on a link round trip delay (RTD) value for the corresponding link between the port module and the switch fabric slice, to cause the cell to arrive at the switch fabric slice a predetermined number of cell times after issuance of the grant, independent of link length; and
   synchronizing transmissions of cells from the switch fabric slices using frames comprising a variable-size frame header and a fixed-size data payload.

2. The method of claim 1, wherein the delay amount is based on a difference between the RTD and the predetermined number of cell times.

3. The method of claim 1, further comprising:
   determining, at each switch fabric slice, a round trip delay (RTD) value for each link by determining a phase difference between a transmitted frame and a received frame.

4. The method of claim 3, further comprising:
   forwarding the determined link RTD values from the respective switch fabric slices to the port module.

5. The method of claim 1, wherein synchronizing transmissions of cells further comprises:
   distributing a low-speed frame clock from a common source to each switch fabric slice.

6. The method of claim 5, wherein synchronizing transmissions of cells further comprises:
   at the switch fabric slices, aligning boundaries of variable-size transmit frames with the frame clock by dynamically modifying sizes of the frames; and
   transmitting the aligned frames.

7. The method of claim 1, wherein the variable-size frame header comprises a variable-size component, followed by a fixed-size component.

8. The method of claim 7, further comprising:
   using the fixed-size component to identify, at port module and switch fabric slice receivers, a beginning of the data payload.

9. The method of claim 1, further comprising:
   at the port module, aligning a boundary of a transmit frame with a frame received from a corresponding switch fabric slice.

10. The method of claim 1, further comprising:
    scrambling the data payload.

11. The method of claim 10, wherein scrambling is performed by a frame synchronous scrambler.

12. The method of claim 1, each switch fabric slice having a local clock, the method further comprising:
    clearing, upon initialization of a link, an elastic buffer, each switch fabric slice receiver containing an elastic buffer large enough to hold at least one full cell.

13. The method of claim 12, further comprising:
    reading data out of an elastic buffer when a) the elastic buffer contains at least a predetermined amount of data, and b) the switch fabric's local clock indicates beginning of a transmit cell boundary.

14. The method of claim 13, further comprising:
    determining, at each switch fabric slice, a round trip delay (RTD) value for each link by determining a phase difference between a transmitted frame and a received frame after reading out of the corresponding elastic buffer.

15. The method of claim 13, wherein the predetermined amount of data is chosen to prevent underflow of the elastic buffer in the presence of worst case timing jitter.

16. The method of claim 1, further comprising:
    operating the port module from a local clock independent of switch fabric clocks.

17. The method of claim 1, at least one port module to switch fabric link spanning a distance of at least one hundred meters.

18. The method of claim 1, wherein synchronizing transmissions of cells further comprises:
    encapsulating groups of cells into said frames.

19. A switching system, comprising:
    plural switch fabric slices; and
    plural port modules connected to the switch fabric slices via links of varying lengths, each port module transmitting a cell to a switch fabric slice in response to a grant received from the switch fabric slice, said transmission being delayed by a delay amount based on a link round trip delay (RTD) value for the corresponding link between the port module and the switch fabric slice, to cause the cell to arrive at the switch fabric slice at a predetermined number of cell times after issuance of the grant, independent of link length, the switch fabric slices synchronizing transmissions of cells using frames comprising a variable-size frame header and a fixed-size data payload.

20. The system of claim 19, wherein the delay amount is based on a difference between the RTD and the predetermined number of cell times.

21. The system of claim 19, each switch fabric slice determining a round trip delay (RTD) value for each link based on a phase difference between a transmitted frame and a received frame.

22. The system of claim 21, wherein the determined link RTD values are forwarded from the respective switch fabric slices to the port module.

23. The system of claim 19, wherein synchronizing transmissions of cells comprises distributing a low-speed frame clock from a common source to each switch fabric slice.

24. The system of claim 23, wherein synchronizing transmissions of cells further comprises encapsulating groups of cells into said frames.

25. The system of claim 24, wherein synchronizing transmissions of cells further comprises:
aligning boundaries of variable-size transmit frames with the frame clock by dynamically modifying sizes of the frames; and
transmitting the aligned frames.

26. The system of claim 19, wherein the variable-size frame header comprises a variable-size component, followed by a fixed-size component.

27. The system of claim 26, wherein the fixed-size component is used to identify, at port module and switch fabric slice receivers, a beginning of the data payload.

28. The system of claim 19, the port module further aligning a boundary of a transmit frame with a frame received from a corresponding switch fabric slice.

29. The system of claim 19, further comprising:
a scrambler which scrambles the data payload.

30. The system of claim 29, wherein the scrambler is a frame synchronous scrambler.

31. The system of claim 19, each switch fabric slice comprising:
a local clock; and
an elastic buffer large enough to hold at least one full cell.

32. The system of claim 31, wherein data is read out of the elastic buffer when a) the elastic buffer contains at least a predetermined amount of data, and b) the switch fabric's local clock indicates beginning of a transmit cell boundary.

33. The system of claim 32, each switch fabric slice determining a round trip delay (RTD) value for each link by determining a phase difference between a transmitted frame and a received frame after reading out of the corresponding elastic buffer.

34. The system of claim 32, wherein the predetermined amount of data is chosen to prevent underflow of the elastic buffer in the presence of worst case timing jitter.

35. The system of claim 19, the port module operating from a local clock independent of switch fabric clocks.

36. The system of claim 19, at least one port module to switch fabric link spanning a distance greater than one hundred meters.

37. A system for maintaining cell arrival time synchronization between a port module and plural switch fabric slices, where links between the port module and the switch fabric slices are of varying lengths, comprising:
means for receiving, at the port module, a grant from a switch fabric slice;
means for transmitting a cell from the port module to the switch fabric slice in response to the grant;
means for delaying said cell transmission by a delay amount based on a link round trip delay (RTD) value for the corresponding link between the port module and the switch fabric slice, to cause the cell to arrive at the switch fabric slice a predetermined number of cell times after issuance of the grant, independent of link length; and
means for synchronizing transmission of cells from the switch fabric slices using frames comprising a variable-size frame header and a fixed-size data payload.

* * * * *